(12) United States Patent
Anghel et al.

(10) Patent No.: US 10,730,633 B2
(45) Date of Patent: Aug. 4, 2020

(54) HYBRID ELECTRIC AIRCRAFT PROPULSION SYSTEM WITH MOTORS USING INDUCTION EFFECT

(71) Applicant: HONEYWELL INTERNATIONAL INC., Morris Plains, NJ (US)

(72) Inventors: Cristian Anghel, Oro Valley, AZ (US); Eric Blumer, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 633 days.

(21) Appl. No.: 15/358,595

(22) Filed: Nov. 22, 2016

(65) Prior Publication Data
US 2018/0141671 A1    May 24, 2018

(51) Int. Cl.
| | | |
|---|---|---|
| B64D 27/24 | (2006.01) | |
| B64D 31/00 | (2006.01) | |
| B64D 35/04 | (2006.01) | |
| B64C 29/00 | (2006.01) | |
| B64D 27/10 | (2006.01) | |
| B64D 35/02 | (2006.01) | |
| B64D 27/02 | (2006.01) | |

(52) U.S. Cl.
CPC ........ *B64D 27/24* (2013.01); *B64C 29/0033* (2013.01); *B64D 27/10* (2013.01); *B64D 31/00* (2013.01); *B64D 35/02* (2013.01); *B64D 35/04* (2013.01); *B64D 2027/026* (2013.01); *B64D 2221/00* (2013.01); *Y02T 50/64* (2013.01)

(58) Field of Classification Search
CPC ........ B64D 31/00; B64D 35/02; B64D 35/04; B64D 27/24; B64D 2027/026
See application file for complete search history.

(56) References Cited

U.S. PATENT DOCUMENTS

| | | | |
|---|---|---|---|
| 4,338,525 A | * | 7/1982 | Kilgore .................... H02P 1/52 290/17 |
| 6,198,238 B1 | * | 3/2001 | Edelson ................... H02K 3/28 318/148 |
| 8,080,950 B2 | | 12/2011 | Beck et al. |
| 8,253,358 B2 | | 8/2012 | Lando |
| 8,274,803 B2 | | 9/2012 | Swamy et al. |
| 8,384,318 B2 | | 2/2013 | Beck et al. |
| 8,421,398 B2 | | 4/2013 | Fisher et al. |
| 9,270,219 B2 | | 2/2016 | Lando et al. |
| 2010/0013300 A1 | | 1/2010 | Lando |

(Continued)

FOREIGN PATENT DOCUMENTS

| | | |
|---|---|---|
| EP | 3046164 A1 | 7/1982 |
| EP | 0117881 A1 | 9/1984 |

*Primary Examiner* — Timothy D Collins
*Assistant Examiner* — Tye William Abell
(74) *Attorney, Agent, or Firm* — Lorenz & Kopf, LLP

(57) ABSTRACT

A hybrid electric aircraft propulsion system at least includes a motor with induction effect to drive a propeller or propulsion fan. The motor is directly supplied from the electrical output of a generator. The generator is driven by a variable speed engine and as such the generator has a output frequency proportional to the speed of the engine. A controller is operatively coupled to the motor, the generator and the engine. The controller is operable to control a speed of the engine and the excitation of the generator to provide an output at a target voltage and frequency to drive the motor at a desired torque and speed.

15 Claims, 2 Drawing Sheets

(56) References Cited

U.S. PATENT DOCUMENTS

| | | | |
|---|---|---|---|
| 2010/0148719 A1* | 6/2010 | Fisher | H02P 27/04 |
| | | | 318/806 |
| 2013/0094963 A1* | 4/2013 | Rolt | B64D 27/02 |
| | | | 416/1 |
| 2015/0283908 A1 | 10/2015 | Himmelmann | |
| 2016/0046247 A1 | 2/2016 | Rozman et al. | |
| 2016/0355272 A1* | 12/2016 | Moxon | B64D 35/04 |
| 2017/0129617 A1* | 5/2017 | Shah | B64D 27/24 |
| 2018/0079515 A1* | 3/2018 | Harwood | B63H 21/17 |

* cited by examiner

HYBRID ELECTRIC AIRCRAFT PROPULSION SYSTEM WITH MOTORS USING INDUCTION EFFECT

TECHNICAL FIELD

This invention generally relates to electric motors propelled aircraft, and more particularly, this invention relates to a method and system to control motors with induction effect used to provide hybrid electric propulsion for an aircraft.

BACKGROUND

Hybrid electric propulsion offers increased maneuverability for aerospace applications and is currently one of the top choices for vertical take-off and vertical landing aircraft. At the same time hybrid electric propulsion increases safety and reliability over traditional systems. It also offers easier maintenance, together with environmental and cost benefits.

In general hybrid electric propulsion systems consist of an engine, that can be a turbine engine, driving a generator to produce electric power which is distributed and conditioned to supply electric motors that drive the propulsion fans or propellers of the aircraft.

Driving the electric motors used for propulsion of an aircraft such that they achieve maximum torque and highest efficiency has required power converters. Since the power required is large, ranging from several hundred kilowatts (kW) to megawatts (MW), the power converters required are heavy, bulky and costly. They also increase the complexity of the system decreasing the overall reliability, providing, in general, a suboptimal system.

Accordingly, it is desirable to provide hybrid electric aircraft propulsion systems and methods of controlling hybrid electric aircraft propulsion systems that maximize torque and efficiency without the additional heavy, costly and complex componentry.

Furthermore, other desirable features and characteristics the herein described embodiments will become apparent from the subsequent detailed description and the appended claims, taken in conjunction with the accompanying drawings and the foregoing technical field and background.

SUMMARY

A hybrid electric aircraft propulsion system includes a motor or plurality of motors to drive a propeller or propulsion fan. The motors are directly supplied from the electrical output of a generator. The generator is driven by a variable speed engine and as such the generator has a rotating speed proportional to the speed of the engine. A controller is operatively coupled to the motor, the generator and the engine. The controller is operable to control a speed of the engine and a excitation of the generator to provide an output at a target voltage and frequency to drive the motor at a desired torque and speed.

An aircraft is provided with a hybrid electric propulsion system. The hybrid electric aircraft propulsion system includes a motor to drive a propeller or propulsion fan. The motors are directly supplied from the electrical output of a generator. The generator is driven by a variable speed engine and as such the generator has a rotating speed proportional to the speed of the engine. A controller is operatively coupled to the motor, the generator and the engine. The controller is operable to control a speed of the engine and a excitation of the generator to provide an output at a target voltage and frequency to drive the motor at a desired torque and speed.

In a hybrid electric aircraft propulsion system that includes a motor to drive a propeller or propulsion fan, and where the motors are directly supplied from the electrical output of a generator, the generator is driven by a variable speed engine and as such the generator has a rotating speed proportional to the speed of the engine. The motor torque and rotational speed is controlled by controlling a speed of the engine and a excitation of the generator to provide an output at a target voltage and frequency to drive the motor.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
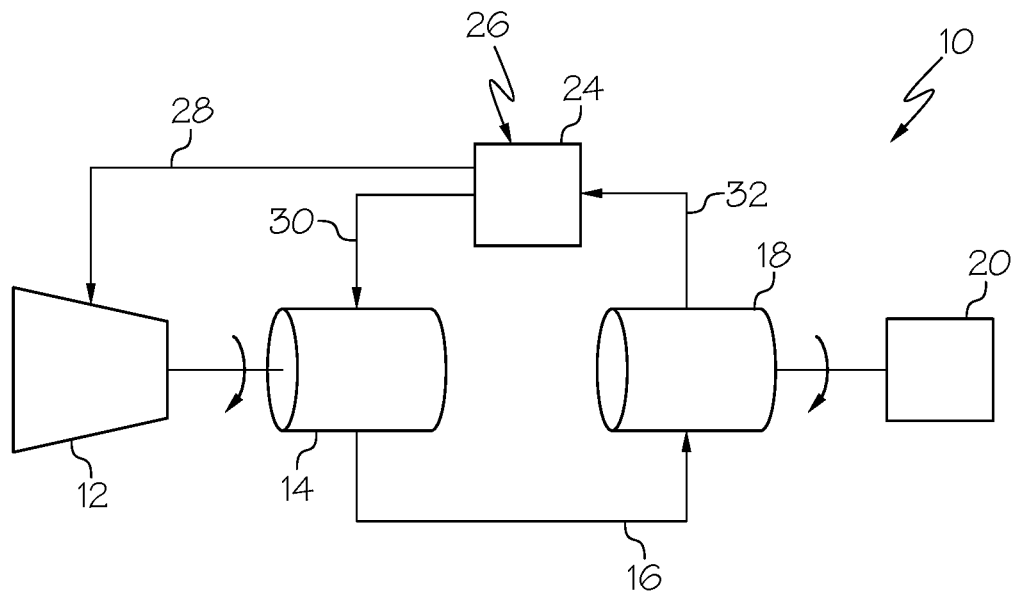
FIG. 1 is a functional block diagram of a hybrid electric propulsion system in accordance with various herein described exemplary embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term system or module may refer to any combination or collection of mechanical and electrical hardware, software, firmware, electronic control component, processing logic, and/or processor device, individually or in any combination, including without limitation: application specific integrated circuit (ASIC), an electronic circuit, a processor (shared, dedicated, or group), memory that executes one or more software or firmware programs, a combinational logic circuit, and/or other suitable components that provide the described functionality.

Embodiments of the invention may be described herein in terms of functional and/or logical block components and various processing steps. It should be appreciated that such block components may be realized by any number, combination or collection of mechanical and electrical hardware, software, and/or firmware components configured to perform the specified functions. For example, an embodiment of the invention may employ various combinations of electrical components, e.g., sensors, integrated circuit components, memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of mechanical and/or electronic systems, and that the systems described herein are merely exemplary embodiment of the invention.

For the sake of brevity, conventional components and techniques and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 3:
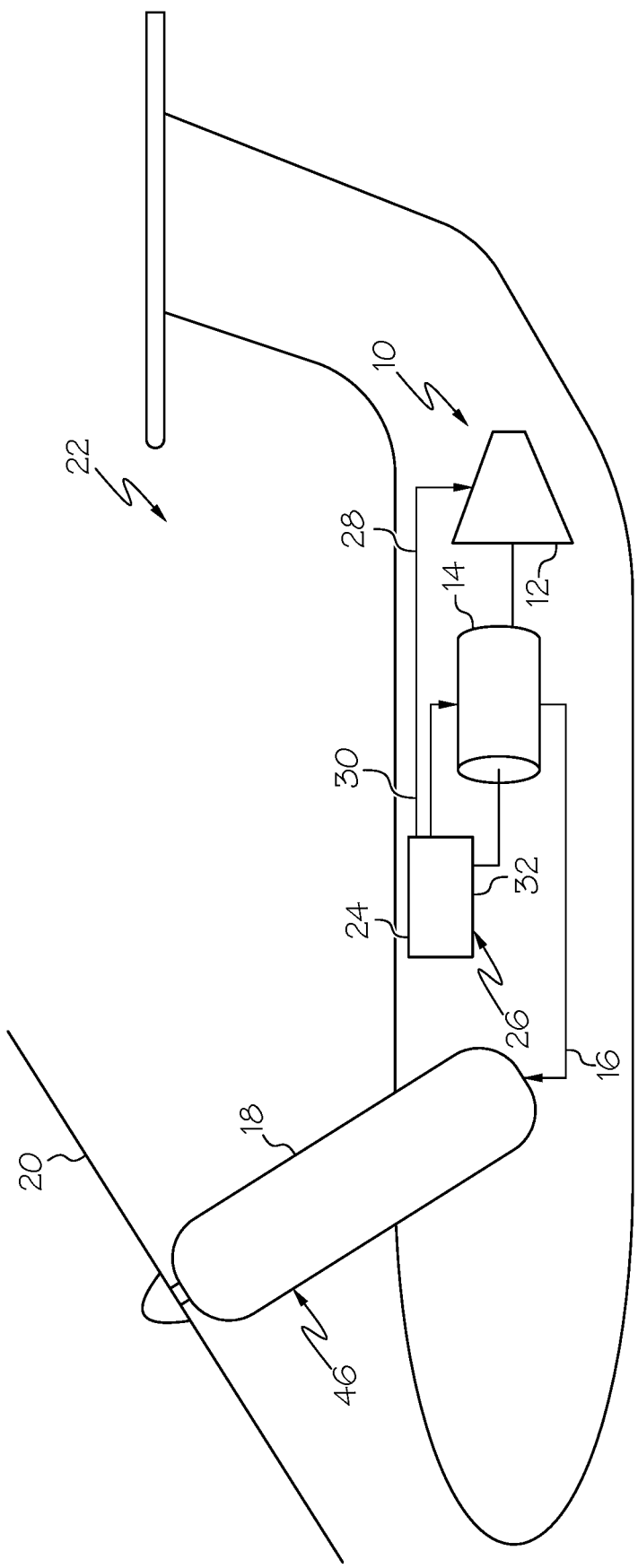
FIG. 3 graphic depiction of aircraft that may incorporate a hybrid electric propulsion system in accordance with one or more of the herein described exemplary embodiments.

FIG. 1 provides a schematic depiction of a hybrid electric propulsion system 10 that includes a turbine engine 12 operatively coupled to drive a generator 14 an electrical power output 16 of which is coupled to a motor 18 that drives one or more propulsion structures 20, e.g., propellers or propulsion fans of an aircraft 22 (see FIG. 3).

The motor 18 is driven directly by the electrical power output 16 of the generator 14. The speed and torque output of the motor 18 is controlled to a given rotational speed based upon the propulsion characteristics of the propulsion structures 20 to meet a thrust requirement of the aircraft 22 for a given operating condition. For example, maximum thrust may be required for take off, climb out and landing, while less thrust may be required for normal cruise flight.

To achieve maximum motor 18 torque output, when required, in a highly efficient manner, e.g., without the use of bulky, heavy and complex power converters, voltage (V) and frequency ($f_g$), of the electrical output 16 of the generator 14 is controlled. Generator output 16 control is accomplished by controlling the rotating speed of the turbine engine 12 and an excitation of the field (not depicted) of the generator 14.

With continued reference to FIG. 1, a controller 24 is operatively coupled to each of the turbine engine 12, the generator 14 and the motor 18 and to a control input 26. The control input 26 may be provided from an operator control, an automated flight control or any other suitable arrangement operable to provide to the controller 24 the control signal 26 which may be data representing a desired/required thrust, a target rotational speed of the motor 18 or other suitable operating indication, and by the direct or geared coupling of the motor 18 with corresponding propulsion structure 20, a corresponding rotational speed of the propulsion structure 20. The controller further receives periodic indications of the actual rotational speed of the motor 18.

To meet a desired generator output 16 such that the motor 18 drives the propulsion structure 20 to a desired speed, the controller 24 delivers operating data 28, such as a motor speed signal, to the turbine engine 12, and in particularly to an engine controller (not depicted) associated with the turbine engine 12. The engine controller controls the supply of fuel and combustion air and other operating characteristics such that the turbine engine 12 achieves a target operating rotational speed. The output of the turbine engine 12 is coupled directly or through a gear box (not depicted) to the generator 14, driving the generator 14 and the result that the generator 14 rotating speed is the same as or proportional to the rotating speed of the turbine engine 12.

In addition to control of the turbine engine 12 target speed, the controller 24 further delivers an excitation control signal 30 to the generator 14, and in particular, to a generator control (not depicted). The generator control adjusts a field excitation of the generator 14 such that the field windings (not depicted) of the generator 14 are excited to create a desired flux.

Responsive to being rotationally driven by the turbine engine 12 and given the field excitation, the generator 14 provides the generator output 16 to the motor 18 at the desired voltage (V) and frequency ($f_g$). In response thereto, the motor 18 drives the propulsion structure 20 at a desired rotating speed to achieve a required operating thrust. The thrust can be also be varied by controlling the pitch of the propeller or by changing the nozzle area of the propulsion fans.

The motor 18 being a motor with induction effect has the capability to operate directly from the alternating current (AC) power output 16 of the generator 14. This motor can be an induction motor (IM), a wound-field synchronous motor (WFSM) with damper bars (as are known and not depicted) providing sufficient induction effect or permanent magnet (PM) motor with induction effect. The motor 18 also has the capability to start directly from the power output 16, but this comes at the expense of potentially large in-rush currents during start. In accordance with the herein described embodiments, the system 10 may control the voltage and the frequency supplied to the motor 18 at start so as to reduce the inrush current, which is another desirable feature of this system.

In operation, the system 10, and in particular the controller 24, is operable to receive the control input 26 indicative of a desired thrust output of the propulsion system 20. The controller 24 additionally receives motor 18 operating data 32 which may include present rotating speed. The controller 24, which may include a processor coupled to a memory containing operating instructions (not depicted) to affect the herein described functionality, is operable based at least upon the control input 26 and operating data 28 to determine a require voltage (V) and frequency ($f_g$) input to the motor 18 to achieve the motor 18 rotating speed in order to achieve the desired thrust from the propulsion system 20. The voltage (V) and the frequency ($f_g$) correlates to a generator 14 rotating speed and field excitation. The controller accordingly provides a speed signal 28 to the turbine engine 12 controller, and a excitation output 30 to the generator 14.

Responsive to the speed signal 28, the turbine engine 12 controller adjusts operating parameters of the turbine engine 12, and for example among various control parameters, an amount of fuel and combustion air provided thereto, to drive the generator 14 at a first rotational speed. Additionally, responsive to the field signal 30, the generator 14 controller energizes the generator field to provide a first field energization so that for a first rotational speed, the generator 14 provides the generator output 16 at the required voltage (V) and frequency ($f_g$). The controller 24 may periodically receive control input 26 and operating data 28, and responsive thereto, adjust the speed signal 28 and excitation signal 30 to operate the turbine engine 12 at a second rotational speed and to energize the field at a second field energization.

When the motor 18 is a WFSM, the excitation to this motor is turned on only after it has started using the induction effect provided by its damper bars and when it is running close to synchronous speed. By turning on its excitation, this motor will run synchronously with the generator's output and it will have high efficiency and power factor providing an optimum system.

Figure 2:
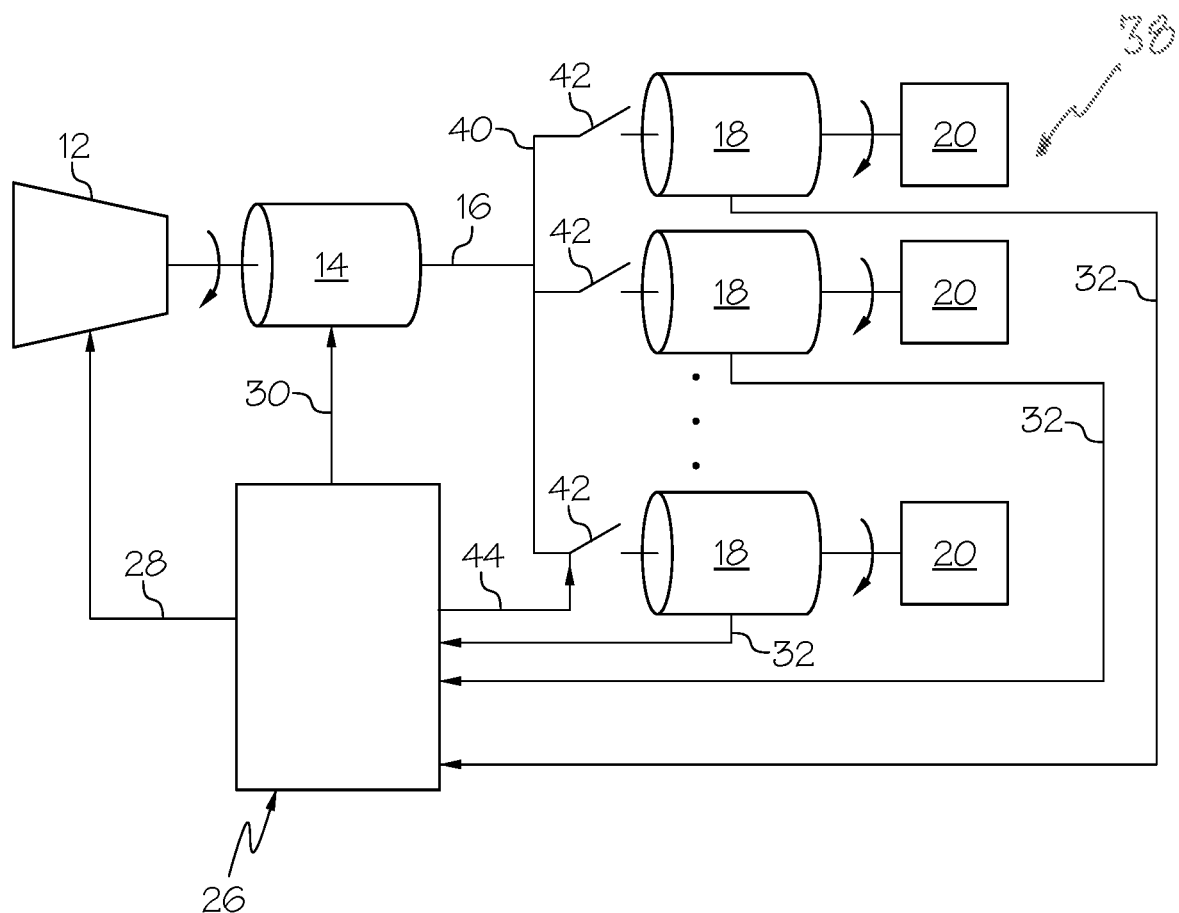
FIG. 2 is a functional block diagram of an alternative exemplary embodiment of a hybrid electric propulsion system.

The embodiment depicted and described in connection with FIG. 1 illustrates a single motor 18/propulsion system 20 combination. FIG. 2 illustrates a propulsion system 38. The propulsion system 38 includes a turbine engine 12 coupled to a generator 14 that provides generator output 16. The system 38 include a plurality of motors 18, each of which is coupled to a propulsion system 20. As depicted, there is provided in this embodiment three (3) motor 18/propulsion system 20 combinations, although various numbers in excess of or less than three (3) may be provided.

The generator output 16 may be directly coupled to each of the motors 18, or as depicted in FIG. 2, the generator output 16 may be coupled to a bus 40 and from the bus 40 via switches 42 the generator output 16 may coupled to the motors 18. The switches 42 may be any suitable mechanical actuating or high-speed, high power electronic switches such as insulated gate bi-polar transistor (IGBT) type high-power electronic switches.

As depicted in FIG. 2, the generator output 16 is provided to each motor 18, and hence, the thrust output of each of the propulsion systems 20 will be relatively equal. The switches 42 provide a level of individual control of the motor 18/propulsion system 20 arrangements. As is known, the switches 42 may be used to turn on or off of the output power 16 respectively to each motor 18. As such, the output of the corresponding propulsion system 20 is affected, essentially diminished in view of the interruption of the generator output power 16 being delivered to a number of motors 18 to provide thrust control for propulsion system 20. In this regard, the controller 24 may provide switch control signals 44 to the switches 42 responsive to the control signal 26 and the operating data 28.

FIG. 3 illustrates an aircraft 22 that may be provided with a hybrid electric propulsion system such as, for example, a system 10 or a system 38. The aircraft 22 is depicted with a pivoting nacelle 46. While a single nacelle 46 is shown, the aircraft in a typical configuration would have nacelles 46 on each of the port and starboard wings. The nacelle 46 may pivot such that thrust from a propeller or fan structure 20 may be directed substantially horizontally, substantially vertically and at various vectors therebetween. This aircraft configuration to include pivoting nacelles allows for very short take-off and landing (VSTOL) operating capability. Of course the hybrid propulsion systems in accordance with the herein described embodiments may be adapted to virtually any aircraft including fixed wing, rotorcraft (helicopter), tilt-rotor (FIG. 3) and the like. This includes distributed propulsion using multiple fans along the aircraft structure or embedded in the airframe.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A hybrid electric aircraft propulsion system comprising:
   a motor having a rotating output, the rotating output operatively coupled to drive a propeller or propulsion fan of an aircraft,
   a generator having a generator output having a voltage and a frequency, the generator output being operatively coupled to the motor such that the motor is energized by the generator output to provide the rotating output, the rotating output being variable in response to the voltage and frequency of the generator output, the generator being operatively coupled for rotational drive to a variable speed turbine engine such that the generator has an output frequency proportional to the speed of the engine, and
   a controller that is operatively coupled to the motor, the generator and the engine, wherein the controller is operable to control a speed of the engine and an excitation of the generator to provide the generator output at a target voltage and frequency to drive the motor to provide the rotating output, wherein
   the motor is a synchronous motor with induction effect, the synchronous motor operable as an induction motor using induction effect during start up and below synchronous speed and operable as a synchronous motor at synchronous speed.

2. The system of claim 1, the motor comprising a plurality of synchronous motors, each synchronous motor being operatively coupled with a propeller or propulsion fan, each of the plurality of motors being coupled to receive the generator output.

3. The system of claim 2, comprising a plurality of switches and wherein each of the plurality of motors is coupled via a switch of the plurality of switches to the generator output.

4. The system of claim 3, wherein each switch of the plurality of switches is individually operable to interrupt the coupling of the generator output with the respective motor.

5. The system of claim 3, wherein the switches are operable to modulate thrust produced by the plurality of motors.

6. An aircraft comprising a hybrid electric aircraft propulsion system, the hybrid electric propulsion system including:
   a motor having a rotating output, the rotating output operatively coupled to drive a propeller or propulsion fan of the aircraft,
   a generator having a generator output having a voltage and a frequency, the generator output being operatively coupled to the motor such that the motor is energized by the generator output to provide the rotating output, the rotating output being variable in response to the voltage and frequency of the generator output, the generator being operatively coupled for rotational drive to a variable speed turbine engine such that the generator has an output frequency proportional to the speed of the engine to provide the generator output, and
   a controller that is operatively coupled to the motor, the generator and the engine, wherein the controller is operable to control a speed of the engine and a excitation of the generator to provide the generator output at a target voltage and frequency to drive the motor to provide the rotating output, wherein
   the motor is a synchronous motor with induction effect, the synchronous motor operable as an induction motor using induction effect during start and below synchronous speed and operable as a synchronous motor at synchronous speed.

7. The aircraft of claim 6 comprising a fixed wing, rotorcraft, tilt-rotor type, or distributed propulsion, multiple fan aircraft.

8. The aircraft of claim 6, the motor comprising a plurality of synchronous motors, each synchronous motor being operatively coupled with a propeller or propulsion fan, each of the plurality of motors being coupled to receive the generator output.

9. The aircraft of claim 8, comprising a plurality of switches and wherein each of the plurality of motors is coupled via a switch of the plurality of switches to the generator output.

10. The aircraft of claim 8, wherein the switches are operable to modulate relative thrust of propulsion fans that are operably coupled with the respective motors.

11. In a hybrid electric aircraft having a motor having a rotating output, the rotating output operatively coupled to drive a propeller or propulsion fan of the aircraft, a generator having a first generator output and a second generator output, different than the first generator output coupled to the motor such that the motor is energized by the first or second generator output to provide the rotating output, and the generator being operatively coupled for rotational drive to a variable speed turbine engine, a method of controlling a thrust output of the propeller or propulsion fan comprising:

adjusting a speed of the turbine engine to drive the generator at a first rotating speed and energizing the generator to a first excitation energization such that for the first rotating speed and first excitation energization the generator provides the first generator output, adjusting a speed of the turbine engine to drive the generator at a second rotating speed and energizing the generator to a second excitation energization such that for the second rotating speed and second excitation energization the generator provides the second generator output providing the first or second generator output to the motor, energizing the motor by the first generator output to operate as an induction motor below a synchronous speed of the motor, and energizing the motor by the second generator output to operate as a synchronous motor at the synchronous speed.

12. The method of claim 11, comprising adjusting the speed of the turbine engine to a second rotating speed different than the first rotating speed.

13. The method of claim 11, wherein the hybrid electric aircraft comprises a plurality of motors each of which drive a respective propeller or propulsion fan, the method comprising providing the first or second generator output to each of the plurality of motors.

14. The method of claim 12, wherein providing the first or second generator output to each of the plurality of motors comprises providing the first or second generator output to each of the plurality of motors via a respective switch.

15. The method of claim 13 comprising modulating the first generator output to the plurality of propellers or propulsion fans.

* * * * *